US007945293B2

(12) United States Patent
Kato et al.

(10) Patent No.: US 7,945,293 B2
(45) Date of Patent: May 17, 2011

(54) INFORMATION PROCESSING APPARATUS AND RADIO CONNECTION METHOD

(75) Inventors: Katsutoshi Kato, Akishima (JP); Toshie Nakamoto, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 845 days.

(21) Appl. No.: 11/902,850

(22) Filed: Sep. 26, 2007

(65) Prior Publication Data

US 2008/0081561 A1 Apr. 3, 2008

(30) Foreign Application Priority Data

Sep. 29, 2006 (JP) ................................. 2006-269519

(51) Int. Cl.
*H04M 1/00* (2006.01)
*H04B 7/00* (2006.01)

(52) U.S. Cl. .................... 455/569.1; 455/41.2; 455/41.3; 455/552.1

(58) Field of Classification Search ............... 455/569.1, 455/41.2, 41.3, 456.2, 517, 66.1, 556.1, 575.9, 455/552.1, 101, 445, 436–437, 550.1, 557

See application file for complete search history.

(56) References Cited

U.S. PATENT DOCUMENTS

| | | | | |
|---|---|---|---|---|
| 7,292,880 B2 * | 11/2007 | Lehtonen | ................... | 455/569.1 |
| 7,523,035 B2 * | 4/2009 | Rokusek et al. | ............... | 704/260 |
| 7,536,212 B2 * | 5/2009 | Nagayasu et al. | ......... | 455/575.2 |
| 7,558,529 B2 * | 7/2009 | Seshadri et al. | ............. | 455/41.2 |
| 7,630,646 B2 * | 12/2009 | Anderson et al. | ............. | 398/132 |
| 7,672,693 B2 * | 3/2010 | Kallio et al. | ............... | 455/569.1 |
| 2004/0114601 A1 | 6/2004 | Watanabe et al. | | |
| 2005/0202852 A1 * | 9/2005 | Wada | ......................... | 455/569.1 |
| 2005/0282589 A1 * | 12/2005 | Barneah | ..................... | 455/569.1 |
| 2006/0229110 A1 * | 10/2006 | Tsai | .......................... | 455/569.2 |
| 2006/0258408 A1 * | 11/2006 | Tuomela et al. | ........... | 455/569.1 |
| 2006/0270466 A1 * | 11/2006 | Liu | ............................. | 455/569.1 |
| 2008/0280654 A1 * | 11/2008 | Solomon | ................... | 455/569.1 |

FOREIGN PATENT DOCUMENTS

| | | |
|---|---|---|
| JP | 2004-282332 | 10/2004 |
| JP | 2006-20152 | 1/2006 |

* cited by examiner

*Primary Examiner* — Pablo N Tran
(74) *Attorney, Agent, or Firm* — Pillsbury Winthrop Shaw Pittman, LLP

(57) ABSTRACT

According to one embodiment, an information processing apparatus, includes a discrimination unit which, upon receiving a connection request from a device corresponding to the identification information stored in a memory unit, reads an information of the mode of connection corresponding to the device and discriminates whether the connection request matches the information of the mode of connection, and a transmission unit which, if it is discriminated by the discrimination unit that the connection request does not match the information of the mode of connection, rejects the connection request and transmits to the device a connection request based on the information of the mode of connection corresponding to the device.

8 Claims, 4 Drawing Sheets

| ID | Profile |
|---|---|
| 003F | HF |
| 003E | HS |

| ID | Profile |
|---|---|
| 003F | HF |

INFORMATION PROCESSING APPARATUS AND RADIO CONNECTION METHOD

CROSS-REFERENCE TO RELATED APPLICATIONS

This application is based upon and claims the benefit of priority from Japanese Patent Application No. 2006-269519, filed Sep. 29, 2006, the entire contents of which are incorporated herein by reference.

BACKGROUND

1. Field

One embodiment of the invention relates to close-range wireless communications technology and, more particularly, to an information processing apparatus a wireless connection method capable of easily connecting to a device in a desired connection mode.

2. Description of the Related Art

As general close-range wireless communications technology, particularly, a technique of communicating with a telephone by Bluetooth™, a predetermined button is pushed down and a headset function and a handsfree function of the connected device are manually changed as disclosed in, for example, JP-A No. 2004-282332.

According to the technology, however, the user needs to manually change the functions and its operation is complicated. In addition, the user needs to know that the connected device has the headset function and the handsfree function.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus, includes a discrimination unit which, upon receiving a connection request from a device corresponding to the identification information stored in a memory unit, reads an information of the mode of connection corresponding to the device and discriminates whether the connection request matches the information of the mode of connection, and a transmission unit which, if it is discriminated by the discrimination unit that the connection request does not match the information of the mode of connection, rejects the connection request and transmits to the device a connection request based on the information of the mode of connection corresponding to the device.

An embodiment of the present invention will be described below with reference to the accompanying drawings.

Figure 1:
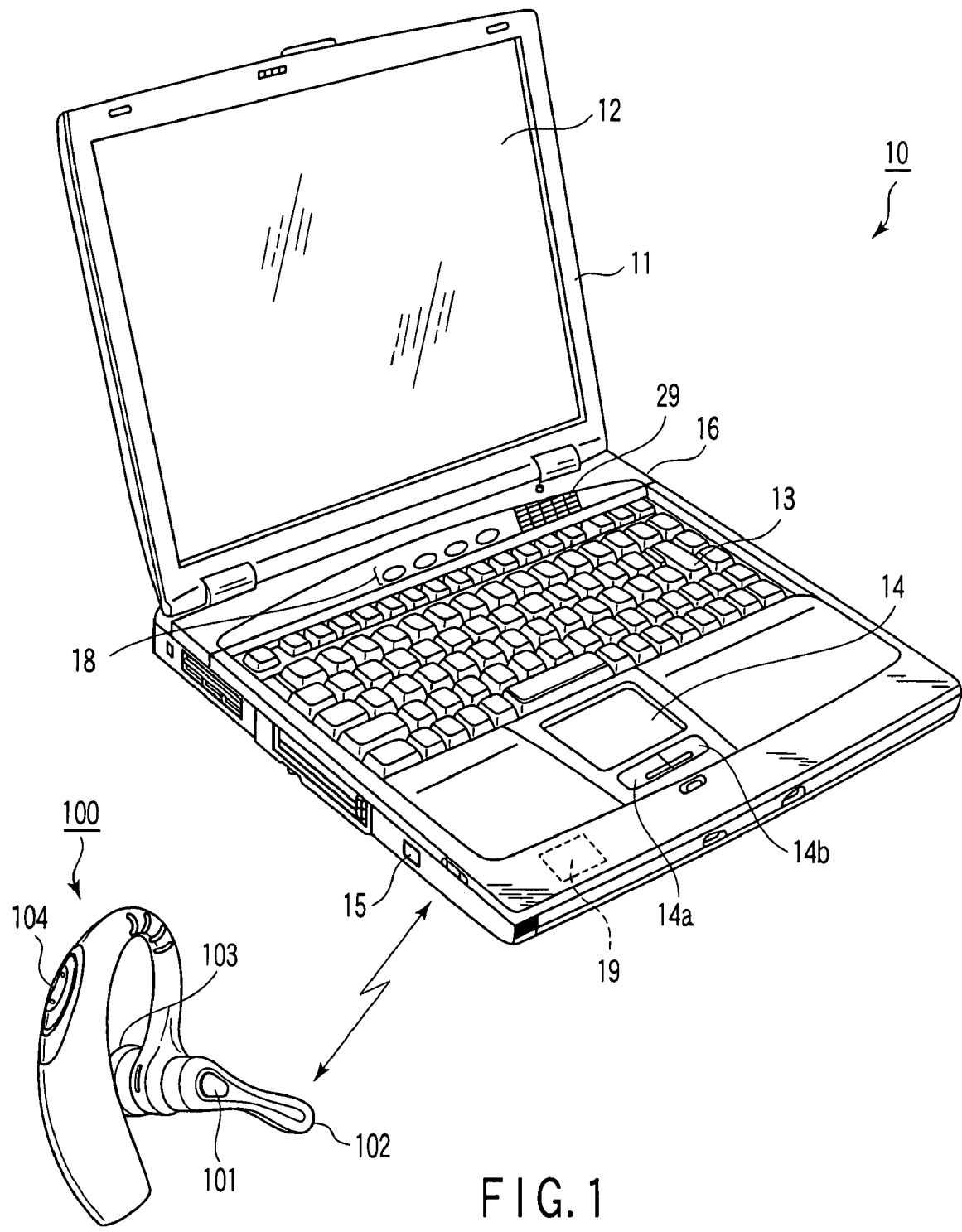
FIG. 1 is an exemplary perspective view showing an outer appearance of an information processing apparatus according to an embodiment of the present invention.

FIG. 1 is a perspective view showing an information processing apparatus according to the embodiment of the present invention. The information processing apparatus is implemented as a battery-operated notebook computer 10.

In the present invention, when connection is made with close-range wireless communications technology such as Bluetooth™, a preset, desired function of functions which the connected device automatically comprises is employed.

The computer 10 is composed of a main body 16 and a display unit 11 as shown in FIG. 1. A display device composed of an LCD (Liquid Crystal Display) is embedded in the display unit 11. A display screen 12 of the LCD is located approximately at the center of the display unit 11.

The display unit 11 is attached to the computer 10 so as to freely pivot between an opened position and a closed position. The main body of the computer 10 has a housing shaped in a thin box, and comprises a keyboard 13 on a top face, and a touch pad 14 and two buttons 14a, 14b on a palm rest, besides various kinds of shortcut buttons including a button for mailing, a power button, a volume control button 18, a speaker 29 and the like. An optical drive 15 is provided on a side face of the main body 16. A Bluetooth™ connection function unit 19 for establishing close-range wireless communications is built in the palm rest. In the present embodiment, Bluetooth™ is employed for close-range wireless communications but the other wireless connection method such as wireless LAN may be employed instead.

A connection device making connection via the Bluetooth™ connection function unit 19 is, for example, a handsfree set 100. A Bluetooth™ connection function unit (not shown) is built in the handsfree set 100, like the computer 10. The unit comprises a conversation start/end button 101, a microphone 102, a speaker 103, a volume control button 104, and the like.

Figure 2:
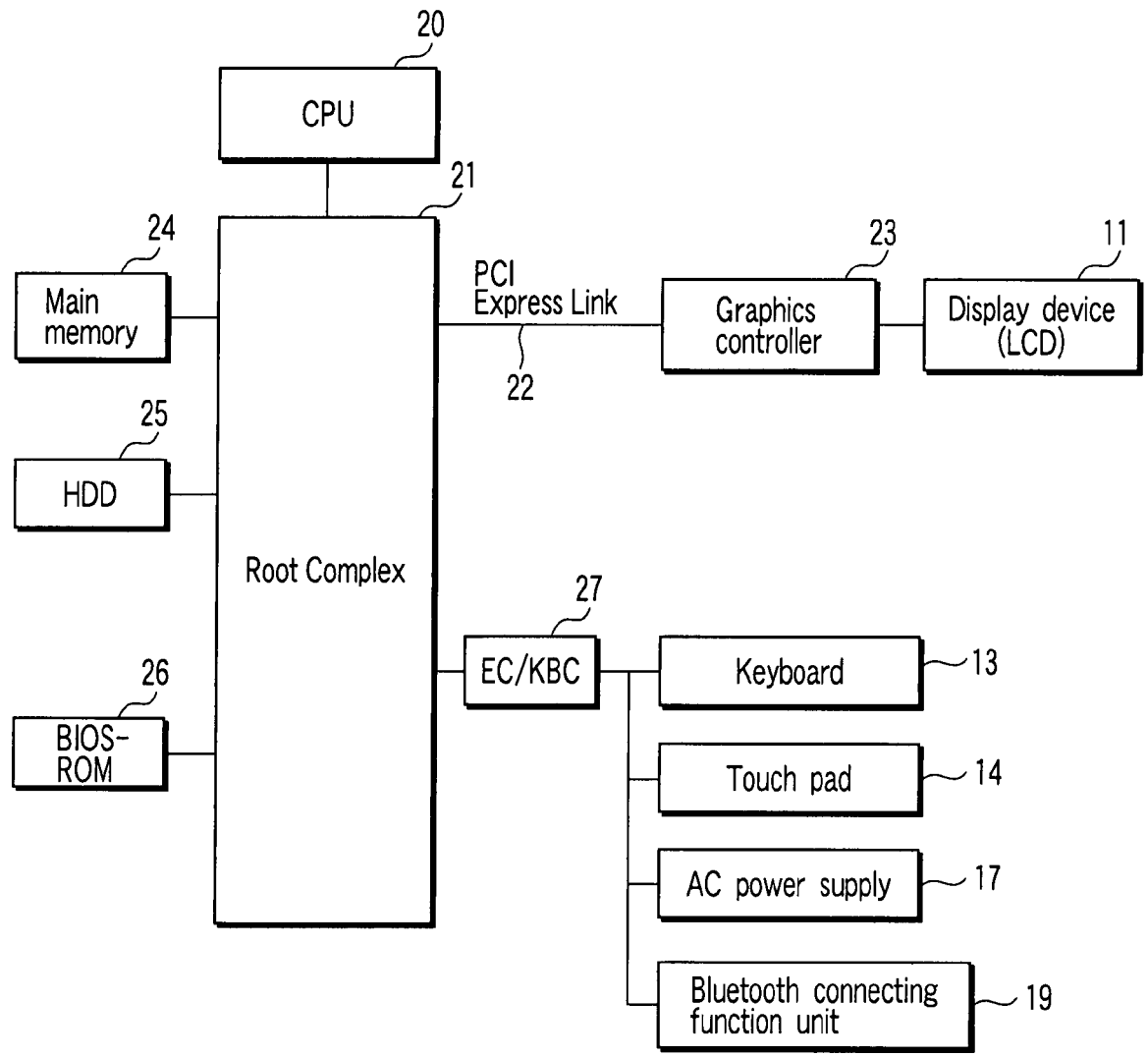
FIG. 2 is an exemplary block diagram showing main components of the information processing apparatus according to the embodiment.

FIG. 2 is a block diagram showing main components of the information processing apparatus according to the embodiment of the present invention.

The computer 10 comprises a CPU (Central Processing Unit) 20, a Root Complex 21, a main memory 24, a graphics controller (End Point) 23, a PCI Express Link 22 making a connection between the Root Complex 21 and the graphics controller 23, the display unit (LCD) 11, an embedded controller/keyboard controller IC (EC/KBC) 27, a hard disk drive (HDD) 25, a BIOS-ROM 26, a keyboard 13, a touch pad 14, an AC power supply 17, a Bluetooth™ connecting function unit 19 and the like.

The Root Complex 21, the graphics controller 23, etc. are devices in conformity with the PCI EXPRESS standards. The communications between the Root Complex 21 and the graphics controller 23 are executed over the PCI Express Link 22 arranged between the Root Complex 21 and the graphics controller 23.

The CPU 20 is a processor controlling the operations of the computer 10, and executes various kinds of programs (operating system and application systems) loaded on the main memory 24 by the HDD 25. In addition, the CPU 20 also executes the BIOS (Basic Input Output System) stored in the BIOS-ROM 26. The BIOS is a program for controlling the hardware.

The Root Complex 21 is a bridge device making a connection between a local bus of the CPU 20 and the graphics controller 23. In addition, the Root Complex 21 also has a function of executing the communications with the graphics controller 23 over the PCI Express Link 22.

The graphics controller 23 is a display controller configured to control the display unit 11 employed as a display monitor of the computer.

The EC/KBC 27 is a one-chip microcomputer on which an embedded controller for power management and a keyboard controller controlling the keyboard 13, the touch pad 14, the AC power supply 17 and the like are integrated. The EC/KBC 27 has a function of controlling power-on/power-off of the computer 10, in cooperation with a power supply controller, in response to the user's operation of the power button.

The Bluetooth™ connecting function unit 19 is a close-range wireless communication device configured to connect with various kinds of Bluetooth™-compatible devices, for example, a handsfree set 100. For the Bluetooth™ connection, identification information of a device which is permitted to make connection needs to be registered preliminarily.

Figure 3:
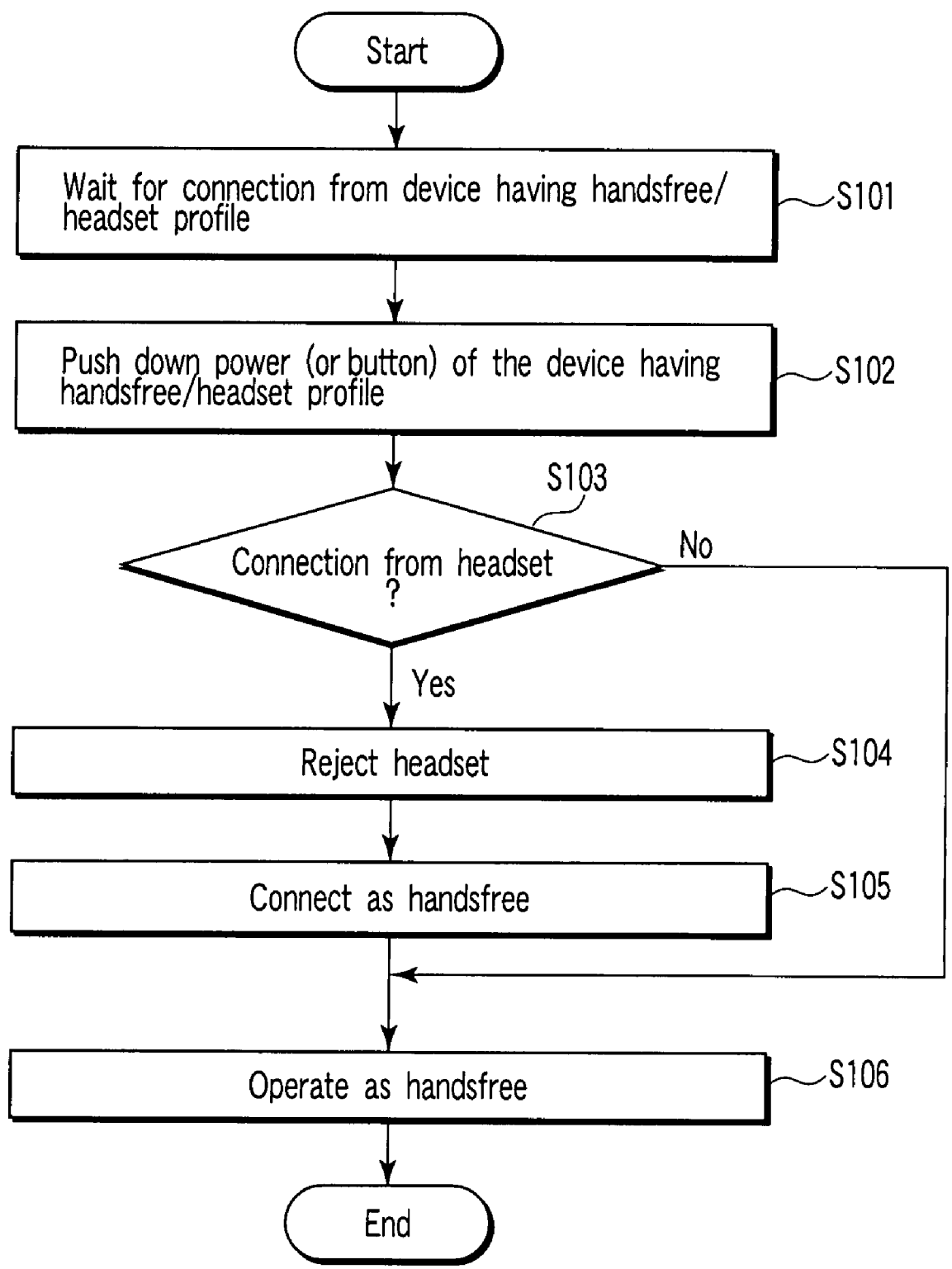
FIG. 3 is an exemplary flowchart of a wireless connection method to which the information processing apparatus according to the embodiment is applied.

Next, a wireless control method employing the information processing apparatus of the present invention having the above-described configuration will be described with reference to a flowchart of FIG. 3 and an illustration of FIG. 4.

First, a device to be connected which is to permit connection is preliminarily registered by the computer 10 and Bluetooth™. As for the device registration, ID, i.e. identification information of the device and profiles, i.e. connection mode information for the device (HF: handsfree, HS: headset, etc.) are registered in association with the device and stored in the HDD (storage unit) 25. As shown in FIG. 5, for example, if a device (hereinafter called device (HF/HS)) comprises two functions HF and HS, the device is assigned ID for each of the functions (profiles). For example, ID: 003F represents profile: HF and ID: 003E represents profile: HS. In addition, as shown in FIG. 6, if a device comprises the only function HF, ID: 003F represents profile: HF.

Upon connection to a device comprising two or more functions such as HF and HS, similar to the device (HF/HS), either of the profiles for connection is set. HF is set here for the connection. The profile HS comprises a function of a microphone and a function of a speaker. The speaker has quality so adequate as to function as a telephone. HF has a conversation ending/outgoing button, besides the function of the HS. It can also be applied to a profile such as A2DP (Advanced Audio Distribution Profile) sync (hereinafter called Audio sync) or the like, other than HS and HF. The Audio sync has higher sound quality than the headset. In a case where the user wishes to listen to music or desires an environment of high sound quality, if a connection request is made from the headset, it is possible to automatically cut the connection with the headset and connect with the Audio sync.

After the registration of the device which is to permit connection has been ended as described above, the CPU 20 of the computer 10 waits for a connection request from the device comprising the both functions HF and HS (step S101). Next, when a device comprising two functions HF and HS or more, similar to the device (HF/HS), is powered on (step S102), the device (HF/HS) automatically transmits a connection request (FIG. 4(1)). This connection request indicates the profile which is set at the device (HF/HS) side, i.e. a request for connection as the HS. The CPU 20 of the computer 10 receives the connection request via Bluetooth™. If the request is the connection request of HS (YES in step S103), the CPU 20 of the computer 10 rejects the connection request of HS (step S104: FIG. 4(2)).

Figures 4, 5, 6:
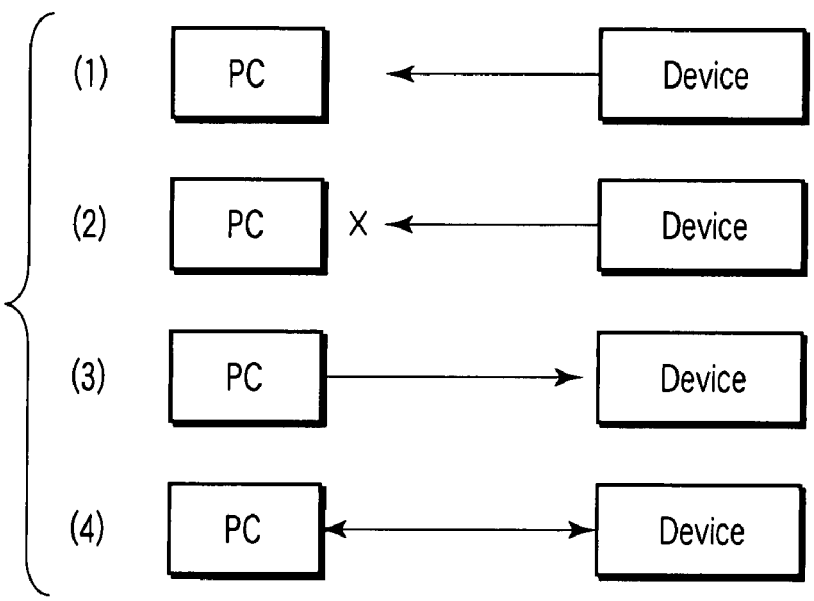
FIG. 4 is an exemplary illustration showing the wireless connection method to which the information processing apparatus according to the embodiment is applied.
FIG. 5 is an exemplary table for registration of a device which is preliminarily allowed to connect to a computer by Bluetooth™.
FIG. 6 is an exemplary table for registration of a device which is preliminarily allowed to connect to a computer by Bluetooth™.

The CPU 20 of the computer 10 transmits to the device making the connection request based on HF, i.e. the connection mode information corresponding to the device (FIG. 4(3)) and connects to the device making the connection request by the HF (step S105). As the device of the client side using Bluetooth™ does not have the rejecting function, the device of the client side is connected in accordance with the connection request from the computer 10 of the host side. The device (HF/HS) is connected as the HF and operated (step S106: FIG. 4(4)).

Validity and invalidity of the above-described process can be changed by the user's setting.

According to the embodiment, for example, when calling is conducted by a device such as a cellular telephone, a personal computer or the like, both the modes different for headset/handsfree device can be employed, and the user can automatically connect to a desirable profile even if he does not know the device mode. The headset/handsfree device which the user desires can be thereby employed. When calling is to be conducted, if the device is connected to the headset, handsfree operations specific to telephone such as incoming call, outgoing call and the like cannot be executed as the headset does not have the telephone function. In this case, too, the headset can be automatically disconnected and connected again as the handsfree device, from the device of the host side such as a cellular telephone, a personal computer or the like. The user is automatically connected as the handsfree device and can obtain a comfortable operation environment. Thus, the user can unconsciously make connection by automatically using a desired function, of the functions of the device to be connected. In other words, even if the function sent from the device to be connected is not the desired function, the connection can be automatically rejected and the connection can be made with the desired function.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a close-range wireless communication unit;
   a memory unit which registers and stores identification information of a device conducting communications via the close-range wireless communication unit and information of a mode of connection to the device;
   a discrimination unit which, upon receiving a connection request from the device corresponding to the identification information stored in the memory unit, reads the information of the mode of connection corresponding to the device from the memory unit, and discriminates whether the connection request matches the information of the mode of connection; and a transmission unit which, if it is discriminated by the discrimination unit that the connection request does not match the information of the mode of connection, rejects the connection request and transmits to the device a connection request based on the information of the mode of connection corresponding to the device.

2. The apparatus according to claim 1, wherein the device comprises a handsfree function and a headset function, and the information of the mode of connection is connection information using the handsfree function and connection information using the headset function.

3. The apparatus according to claim 2, wherein if the connection request is a connection request using the headset function, upon receiving the connection request from the device corresponding to the identification information, the apparatus rejects the connection request and transmits the connection request using the handsfree function to the device.

4. The apparatus according to claim 2, wherein the device comprises an audio function, besides the handsfree function and the headset function, and the information of the mode of connection is at least one of the connection information using the handsfree function, the connection information using the headset function, and connection information using the audio function.

5. A wireless connection method using a wireless connection method comprising a close-range wireless communication unit, the method comprising:

registering and storing in a memory unit identification information of a device conducting communications via the close-range wireless communication unit and information of a mode of connection to the device;

upon receiving a connection request from the device corresponding to the identification information stored in the memory unit, reading the information of the mode of connection corresponding to the device from the memory unit, and discriminating whether the connection request matches the information of the mode of connection; and if it is discriminated by the discrimination unit that the connection request does not match the information of the mode of connection, rejecting the connection request and transmitting to the device a connection request based on the information of the mode of connection corresponding to the device.

6. The method according to claim 5, wherein the device comprises a handsfree function and a headset function, and the information of the mode of connection is connection information using the handsfree function and connection information using the headset function.

7. The method according to claim 6, wherein if the connection request is a connection request using the headset function, upon receiving the connection request from the device corresponding to the identification information, the apparatus rejects the connection request and transmits the connection request using the handsfree function to the device.

8. The method according to claim 6, wherein the device comprises an audio function, besides the handsfree function and the headset function, and the information of the mode of connection is at least one of the connection information using the handsfree function, the connection information using the headset function, and connection information using the audio function.

* * * * *